(12) United States Patent
Gulati et al.

(10) Patent No.: US 9,955,150 B2
(45) Date of Patent: Apr. 24, 2018

(54) TESTING OF DISPLAY SUBSYSTEMS (71) Applicant: QUALCOMM Incorporated, San Diego, CA (US)

(72) Inventors: Rahul Gulati, Bangalore (IN); John Chi Kit Wong, Markham (CA); Pranjal Bhuyan, Bangalore (IN); Sanjay Gupta, North York (CA); Hemang Jayant Shah, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,348

(22) Filed: Sep. 24, 2015

(65) Prior Publication Data

US 2017/0094268 A1    Mar. 30, 2017

(51) Int. Cl.
*H04N 17/00* (2006.01)
*B60K 35/00* (2006.01)
*G09G 3/00* (2006.01)

(52) U.S. Cl.
CPC ........... *H04N 17/004* (2013.01); *B60K 35/00* (2013.01); *G09G 3/006* (2013.01)

(58) Field of Classification Search
CPC ............. H04N 17/004; G09G 2320/12; G09G 2320/0693; G06F 11/26; G06F 11/273
See application file for complete search history.

(56) References Cited

U.S. PATENT DOCUMENTS

| | | | |
|---|---|---|---|
| 4,780,755 A | 10/1988 | Knierim | |
| 5,038,210 A | 8/1991 | Deckelmann et al. | |
| 5,537,145 A * | 7/1996 | Miseli | G09G 3/006 345/904 |
| 5,861,882 A * | 1/1999 | Sprenger | G01R 1/025 700/83 |
| 5,920,340 A * | 7/1999 | Man | H04N 17/045 348/181 |
| 6,101,620 A * | 8/2000 | Ranganathan | G11C 29/20 345/519 |
| 6,717,625 B1 * | 4/2004 | Thielemans | H04N 9/31 348/177 |
| 6,726,103 B1 * | 4/2004 | Motta | H04N 5/2178 235/454 |
| 6,839,055 B1 * | 1/2005 | Nguyen | G09G 3/006 345/204 |
| 7,062,696 B2 * | 6/2006 | Barry | G01R 31/31813 714/733 |

(Continued)

OTHER PUBLICATIONS

Bigelow, "After years of delays, NHTSA issues backup camera rules," autoblog.com, Mar. 31, 2014, 2 pp.

(Continued)

*Primary Examiner* — Brian Yenke
(74) *Attorney, Agent, or Firm* — Shumaker & Sieffert, P.A.

(57) ABSTRACT

A display processor of a display system may receive an image that includes a test pattern. An input checksum may be associated with the test pattern. Hardware units of the display processor may process the image. The display system may generate an output checksum based at least in part on the test pattern after processing of the image. The display system may detect a fault in the hardware units of the display processor based on determining a difference between the input checksum and the output checksum.

21 Claims, 6 Drawing Sheets

(56) References Cited

U.S. PATENT DOCUMENTS

| | | | |
|---|---|---|---|
| 7,085,408 B1* | 8/2006 | Chung-Chi Jim | H04N 5/335 250/208.1 |
| 7,313,696 B2 | 12/2007 | De | |
| 7,657,807 B1* | 2/2010 | Watkins | G01B 31/318594 714/718 |
| 8,018,492 B2* | 9/2011 | Musunuri | H04N 17/004 348/192 |
| 8,636,367 B1* | 1/2014 | Callison | G02B 26/12 353/122 |
| 8,736,679 B2 | 5/2014 | Jackson | |
| 9,117,123 B2 | 8/2015 | Nix | |
| 9,251,598 B2 | 2/2016 | Wells et al. | |
| 9,357,208 B2 | 5/2016 | Gupta et al. | |
| 2003/0164835 A1* | 9/2003 | Burk | G06F 11/267 345/506 |
| 2007/0011407 A1* | 1/2007 | Kuehl | G06F 11/2284 711/141 |
| 2007/0040841 A1* | 2/2007 | Kim | G09G 5/003 345/531 |
| 2007/0182681 A1 | 8/2007 | Kim | |
| 2007/0296822 A1 | 12/2007 | Lan et al. | |
| 2008/0129826 A1* | 6/2008 | Musunuri | H04N 17/004 348/192 |
| 2008/0141072 A1* | 6/2008 | Kalgren | G01D 3/08 714/33 |
| 2008/0158363 A1* | 7/2008 | Myers | H04N 17/002 348/187 |
| 2009/0213226 A1* | 8/2009 | Man | G09G 3/006 348/189 |
| 2011/0035631 A1* | 2/2011 | Bhinge | G01R 31/31835 714/48 |
| 2011/0050877 A1* | 3/2011 | Ookubo | H04N 7/183 348/82 |
| 2011/0099425 A1 | 4/2011 | Liu | |
| 2011/0102650 A1 | 5/2011 | Shoyama | |
| 2011/0298978 A1* | 12/2011 | Strein | H04N 17/004 348/512 |
| 2012/0110382 A1* | 5/2012 | Tang | G06F 11/263 714/32 |
| 2012/0127324 A1* | 5/2012 | Dickins | G09G 3/006 348/191 |
| 2012/0221884 A1* | 8/2012 | Carter | G06F 11/0772 714/2 |
| 2013/0083204 A1* | 4/2013 | Solhusvik | H04N 5/378 348/187 |
| 2013/0145225 A1* | 6/2013 | Lin | G11C 29/42 714/722 |
| 2014/0059252 A1* | 2/2014 | Stettin | G06F 13/102 710/8 |
| 2014/0195870 A1* | 7/2014 | Ma | G01R 31/31932 714/735 |
| 2014/0292997 A1* | 10/2014 | Hung | H04N 9/735 348/14.01 |
| 2014/0362295 A1* | 12/2014 | Suzuki | G09G 5/003 348/564 |
| 2015/0277838 A1* | 10/2015 | Gyllensward | G06F 3/147 345/694 |
| 2015/0281742 A1* | 10/2015 | Staudenmaier | H04N 19/65 375/240.27 |
| 2017/0026605 A1* | 1/2017 | Aubineau | H04N 5/38 |

OTHER PUBLICATIONS

U.S. Appl. No. 15/458,488, filed Mar. 14, 2017, first named inventor Rahul Gulati.

International Search Report and Written Opinion from International Application No. PCT/US2016/049465, dated Nov. 18, 2016, 13 pp.

\* cited by examiner

TESTING OF DISPLAY SUBSYSTEMS

TECHNICAL FIELD

The disclosure relates to concurrent online testing of a display subsystem.

BACKGROUND

An automobile may include a display device that can provide information, data, images, videos, and the like to the driver of the vehicle. For example, the display device may display the video captured by the rear view camera to assist the driver of the vehicle in safely reversing out of a parking space. Further, the display device may be part of, or operably coupled to, an automotive advanced driver assistance system (ADAS) such that the display device may also display blind spot warnings to alert the driver that there are vehicles situated at the driver's blind spot.

SUMMARY

In general, aspects of the disclosure are directed to techniques for concurrent online testing of a display subsystem. In certain applications, for example, if the display subsystem is included in, or operably coupled to, an automotive advanced driver assistance system (ADAS) or a flight control system for controlling an aircraft, the integrity of the display subsystem may be especially important to maintaining the safety of the driver and passengers of the vehicle. The display subsystem may process images and perform image operations on such images before those images are displayed by the display device. If the display subsystem is faulty and therefore introduces errors into images during image processing, then the user may not be able to rely on the accuracy of the images that are displayed by the display device. In the example of the display device that displays the video captured by the rear view camera, the display subsystem may impact the safety of the driver and passengers, as well as pedestrians and occupants of other vehicles in a negative fashion if the display subsystem malfunctions, because the display device may therefore not accurately display the video captured by the rear view camera.

In one aspect, the disclosure is directed to a method for testing of a display system. The method includes receiving, by a display processor of a display system, an image that includes a test pattern, wherein an input checksum is associated with the test pattern. The method further includes processing, by one or more hardware units of the display processor, the image. The method further includes generating, by the display processor, an output checksum based at least in part on the test pattern after processing of the image by the one or more hardware units of the display processor. The method further includes detecting, by the computing device, a fault in the one or more hardware units of the display processor based at least in part on determining a difference between the input checksum and the output checksum.

In another aspect, the disclosure is directed to an apparatus. The apparatus includes a memory configured to store an image that includes a test pattern, wherein an input checksum is associated with the image. The apparatus further includes a display processor configured to: receiving the image that includes the test pattern; process the image; generate an output checksum based at least in part on the test pattern after processing of the image by the one or more hardware units of the display processor; and detect a fault in the display processor based at least in part on determining a difference between the input checksum and the output checksum.

In another aspect, the disclosure is directed to an apparatus. The apparatus includes means for receiving an image that includes a test pattern, wherein an input checksum is associated with the test pattern. The apparatus further includes means for processing the image. The apparatus further includes means for generating an output checksum based at least in part on the test pattern after processing of the image by the means for processing the image. The apparatus further includes means for detecting a fault in the means for processing the image based at least in part on determining a difference between the input checksum and the output checksum.

In another aspect, the disclosure is directed to a non-transitory computer-readable storage medium comprising instructions for causing at least one programmable processor to: receive an image that includes a test pattern, wherein an input checksum is associated with the test pattern; process the image; generate an output checksum based at least in part on the test pattern after the processing of the image; and detect a fault in the one or more hardware units of the display processor based at least in part on determining a difference between the input checksum and the output checksum.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed to concurrent online testing of a display subsystem.

To ensure that the display subsystem is operating correctly without fault, a the display subsystem may perform concurrent and online testing of itself to detect operational faults that occur while the display subsystem processes image for display by a display device that is operably coupled to or included in the computing device. Concurrent testing of the display subsystem may be a continuous testing of the display subsystem while the computing device is powered on. Online testing of the display subsystem may include testing of the display subsystem while the computing device and the subsystem are powered on and performing its normal functionality. In other words, the computing device may perform testing of the display subsystem while the computing device is powered on and in use by a user without entering into a dedicated test mode, and without switching off the display device. Thus, if the computing device is an ADAS, the user of the ADAS may use the ADAS to, for example, view video streamed from a rear view camera of the vehicle while ADAS performs concurrent and online testing of the display subsystem Such concurrent and online testing of the display subsystem may detect operational faults of the display subsystem, which may include a blank screen, a frozen frame, or an incorrect display of data. Operational faults may include permanent faults, intermittent faults, and transient faults. Permanent faults may be faults that remain in existence indefinitely if no corrective action is taken. Such faults may be residual design or manufacturing faults. Intermittent faults may appear, disappear, and reappear repeatedly. Such faults may be difficult to predict but their effects may be highly correlated. When such intermittent faults appear, the display subsystem may work correctly most of the time but may fail under atypical environmental conditions. Transient faults may appear and disappear quickly, and such faults may not be correlated. Such transient faults are often induced by random environmental disturbances.

A display system configured to perform the techniques of this disclosure may perform concurrent and online testing of itself to detect operational faults of the display subsystem via a systematic testing methodology. The display subsystem may include mechanisms for performing concurrent and online built-in self-tests for several hardware sub-blocks in the display subsystem during normal operation of the display subsystem. The display subsystem may perform such built-in self-tests to detect whether the hardware sub-blocks in the display subsystem introduces any errors into an image that the display subsystem processes for display by the display device. The display subsystem may be a part of a computing device, such as an ADAS, and the like, or may be a standalone module that may perform the built-in self tests described throughout this disclosure.

Figure 1:
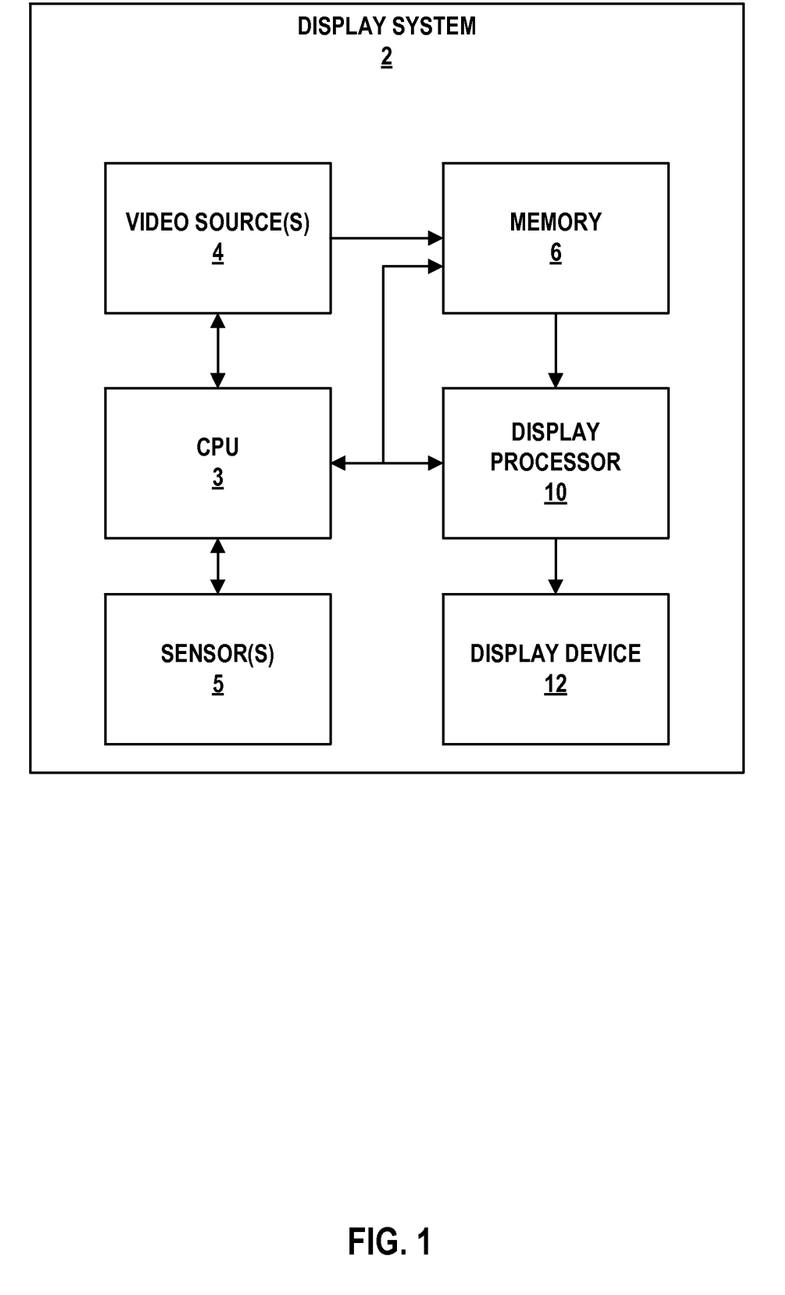
FIG. 1 is a block diagram illustrating an example display system that may be configured to implement one or more aspects of this disclosure.

FIG. 1 is a block diagram illustrating an example display system that may be configured to implement one or more aspects of this disclosure. In the example of FIG. 1, display system 2 may be a system that includes processor 3, memory 6, sensors 5, and display processor 10. Display system 2 may also be operably coupled to one or more video sources 4 and display device 12. Display processor 10 may be part of the same integrated circuit (IC) as processor 3, may be external to the IC or ICs that include processor 3, or may be formed in the IC that is external to the IC that includes processor 3. It should be understood that display system 2 may include modules and units other than the ones in the example of FIG. 1, and that, in some examples, display system 2 may also not include one or more of the modules and units in the example of FIG. 1. For example, display system 2 may not necessarily include or be operably coupled to one or more video sources 4.

Display system 2 may be any suitable device or system that includes a display subsystem or processor for processing images that are displayed by display device 12 included in or operably coupled to display system 2. Examples of display system 2 may include a computing device, such as a desktop computer, a laptop computer, a tablet, a smartphone, a specialized computing device such as an ADAS, a wearable device such as a head mounted display, and the like.

For example, display system 2 may be hardware for processing images and video that are displayed by display device 12 that is part of a vehicle control system or vehicle safety system to aid the operation of a vehicle. Display system 2 may also be hardware for processing captured video that is to be displayed by a head mounted display, an augmented reality headset, and the like, and may process video captured by cameras that are displayed by display device 12 that is a head mounted display. In another example, display system 2 may be hardware for processing video captured by a drone, such that display system 2 may be part of the computing system that wirelessly receives video captured by cameras coupled to the drone. Display system 2 may also be hardware that is part of a flight control system that processes critical safety information for operating an aircraft, such as altimeter readings, radar images, and the like, for display by display device 12 in the cockpit of the air craft. In other examples, display system 2 may be any other suitable hardware for processing images that are to be displayed by a display device, such as display device 12.

Video sources 4 may include video cameras, graphics processing units, and other suitable video sources from which display processor 10 may receive images and video for display at display device 12. If video sources 4 is a part of or coupled to an ADAS, video sources 4 may include rear view cameras, front view cameras, side view cameras, and the like that capture videos and/or images of the exterior surroundings of the vehicle that includes the ADAS. Video sources 4 may, for example, include a rearview camera that assists the driver of the vehicle in backing up the vehicle by capturing a video of the rear exterior surroundings of the vehicle that is displayed by display device 12. Video sources 4 may also include cameras that capture video that are displayed by display device 12 that is part of a head mounted display, an augmented reality headset, and the like, or may be cameras mounted on a drone that transmits video wirelessly to display device 12.

Video sources 4 may also include additional cameras that capture videos that are displayed by display device 12 of blind spots that a driver of the vehicle may have to assist the driver in collision avoidance. It should be understood that, in some examples, display system 2 may not include or be operably coupled to video sources 4.

Video sources 4 may also include cameras that capture video that are displayed by display device 12 that is part of a head mounted display, an augmented reality headset, and the like, or may be cameras mounted on a drone that transmits video wirelessly to display device 12. In other examples, video sources 4 may include images generated by processor 3 for display by display device 12.

Memory 6 may include an output buffer that stores such images for output by display device 12. For example, memory 6 may store images or video frames received from video sources 4. Display processor 10 may include one or more hardware units that retrieves images stored in memory 6, performs one or more image processing operations on the retrieved images, and outputs the processed images to display device 12 for display by display device 12. In other words, display processor 10 retrieves an image from memory 6 and may output values that cause the pixels of display device 12 to illuminate to display the image. In some examples, display processor 10 may be configured to perform image processing operations on the image retrieved from memory 6 to be displayed by display device 12. Such image processing operations may include format converting, scaling, rotation, blending, and compositing, layering of the image with additional graphics, and the like.

Display device 12 may be included in or operably coupled to display system 2 to display image content after processing by display processor 10. Display device 12 may be a liquid crystal display (LCD), an organic light emitting diode display (OLED), a cathode ray tube (CRT) display, a plasma display, or another suitable type of display device.

Processor 3 may be a microprocessor, such as a central processing unit (CPU) configured to process instructions of a computer program for execution. Processor 3 may comprise a general-purpose or a special-purpose processor that controls operation of display system 2. In some examples, processor 3 may include or be coupled to a digital signal processor (DSP) or graphics processing unit (DSP) that generates or processes images for display by display device 12. A user may provide input to display system 2 to cause processor 3 to execute one or more software applications. The software applications that execute on processor 3 may include, for example, an operating system for the display system 2, a graphical user interface application or another program.

Memory 6 may include one or more volatile or nonvolatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. In some examples, memory 6 may store fully formed images received from video sources 4. Display processor 10 may retrieve the image from memory 6 and output values that cause the pixels of display device 12 to illuminate to display the image. In some examples, display processor 10 may be configured to perform 2D operations on data to be displayed, including scaling, rotation, blending, and compositing. Display device 12 may be the display of display system 2 that displays the image content processed by display processor 10. Display device 12 may be a liquid crystal display (LCD), an organic light emitting diode display (OLED), a cathode ray tube (CRT) display, a plasma display, or another type of display device.

Display system 2 may include additional modules or units not shown in FIG. 1 for purposes of clarity. In some examples, a user may provide input to display system 2 via one or more input devices (not shown) such as a keyboard, a mouse, a microphone, a touch pad or another input device that is coupled to display system 2 via a user interface. Furthermore, the various modules and units shown in display system 2 may not be necessary in every example of display system 2. For example, video sources 4 and display device 12 may be external to display system 2.

In accordance with one aspect of the present disclosure, display processor 10 may receive an image that includes a test pattern in a region of interest of the image. An input checksum may be associated with the test pattern. One or more hardware units of display processor 10 may process the image. Display system 2 may generate an output checksum based at least in part on the test pattern in the region of interest of the image after processing of the image by the one or more hardware units of display processor 10. Display system 2 may detect a fault in the one or more hardware units of display processor 10 based at least in part on determining a difference between the input checksum and the output checksum.

Figure 2:
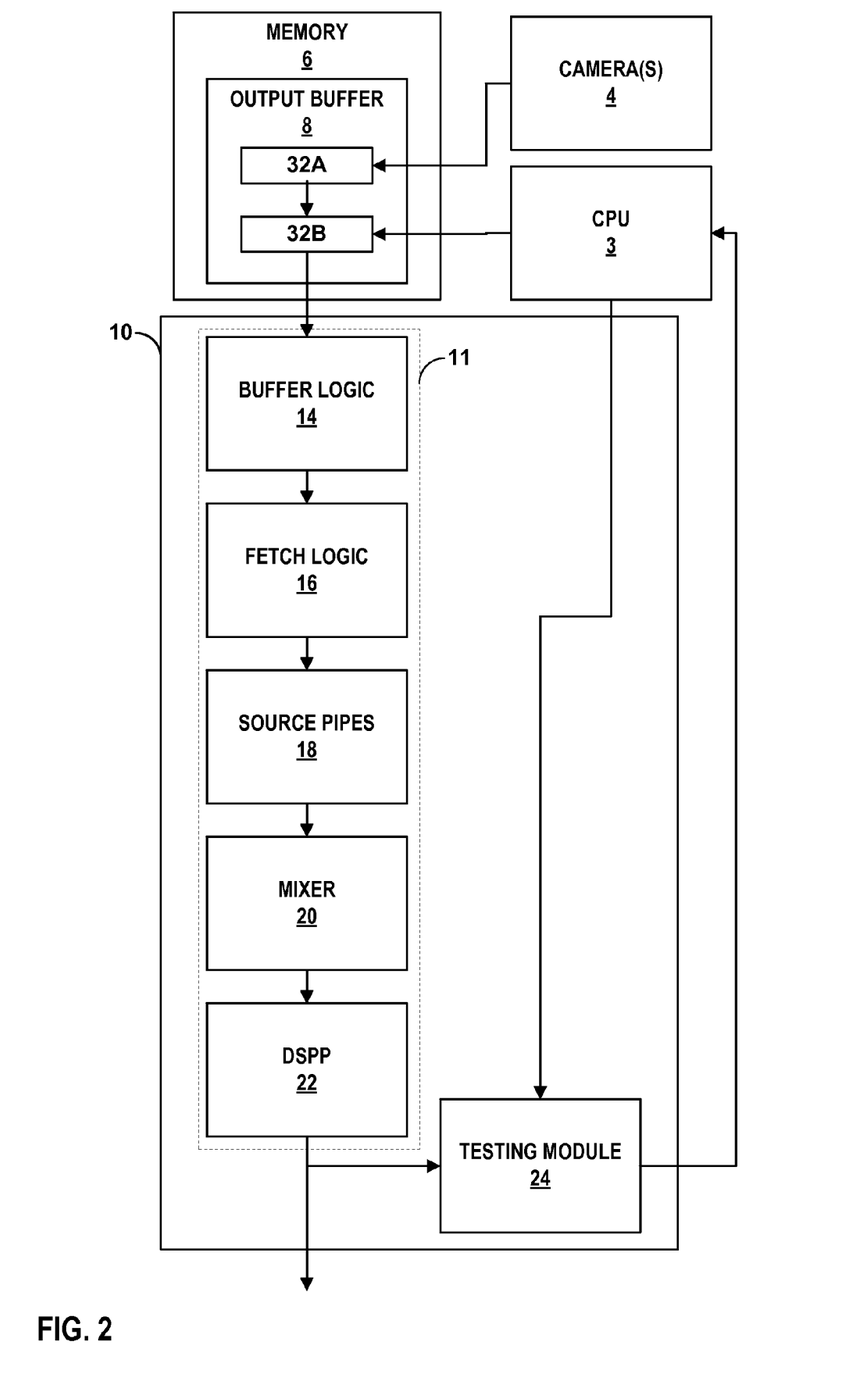
FIG. 2 is a block diagram illustrating the example display processor of FIG. 1 in further detail.

FIG. 2 is a block diagram illustrating the example display processor of FIG. 1 in further detail. As shown in FIG. 2, display processor 10 may include buffer logic 14, fetch logic 16, source surface processor pipes 18, layer mixer 20, destination surface processor (DSPP) 22, and testing module 24. Display processor 10 may include additional modules or units not shown in FIG. 2 for purposes of clarity. For example, display system 2 may include additional modules and units for performing hardware-accelerated image processing. Furthermore, the various modules and units shown in display processor 10 may not be necessary in every example of display processor 10.

Fetch logic 16 and buffer logic 14 may respectively retrieve an image from output buffer 8 of memory 6 for display by display device 12 and store the image retrieved by display processor 10 from memory 6 for further processing by the other hardware units of display processor 10. Source surface processor pipes 18 may receive an image from buffer logic 14 and fetch logic 16, and may perform format conversion and quality improvement for source surfaces of videos and images. For example, source surface processor pipes 18 may process a received image by performing color space conversion, content adaptive contrast enhancement, flip operations, and the like on the received image, and may output the processed image to layer mixer 20.

Layer mixer 20 may receive the image from source surface processor pipes 18 and may perform blending and mixing of the image with one or more other surfaces. For example, layer mixer 20 may perform alpha blending, color generation, setting of a transparency color key, blending of surfaces in arbitrary order, and blending in linear space. For example, display processor 10 retrieves an image from memory 6 that is one frame of a video captured by video sources 4 for processing. Layer mixer 20 may receive the image, mix the image with one or more additional graphical surfaces or images, and output the mixed image. For example, layer mixer 20 may layer the frame of the video captured by video sources 4 with one or more surfaces that include a graphical trajectory lines that indicate the vehicle's trajectory as it backs up according to the current steering angle of the vehicle, GUI menu options, and the like. Layer mixer 20 may output the blended/mixed image to DSPP 22.

DSPP 22 may perform conversion, correction, and adjustments on the image received from layer mixer 20 based on particular characteristics of display device 12. For example, DSPP 22 may perform operations for sunlight visibility improvement, content adaptive backlight scaling, panel color correction, gamma correction, dithering, picture adjustments, and the like. Once DSPP 22 has completed its image operations on the image, display processor 10 may output the processed image to display device 12 via, for example, a display interface controller (not shown) for display by display device 12.

Buffer logic 14, fetch logic 16, source surface processor pipes 18, layer mixer 20, and DSPP 22 may form display subsystem pipeline 11 through which images received by display processor 10 for display at display device 12 are processed. For example, for each image retrieved from memory 6 by display processor 10, the image may be processed in order by each of buffer logic 14, fetch logic 16, source surface processor pipes 18, layer mixer 20, and DSPP 22, respectively. Display subsystem pipeline 11 may include additional hardware units not depicted in FIG. 2 that are configured to perform image processing operations on images received by display processor 10. Display subsystem pipeline 11 may also include fewer hardware units than depicted in the example of FIG. 2.

As such, to ensure the integrity of the display subsystem pipeline, display processor 10 may use testing module 24 to determine whether display subsystem pipeline 11 introduces any errors as an image is processed through display subsystem pipeline 11 of buffer logic 14, fetch logic 16, source surface processor pipes 18, layer mixer 20, and DSPP 22. If display processor 10 determines that display subsystem pipeline 11 introduces an error to a processed image, then the user of display system 2 may not be able to safely rely on what is displayed by display device 12 as an accurate representation of, for example, the video frames captured by video sources 4.

Testing module 24 may perform a built-in self-test of display subsystem pipeline 11 to test the integrity of display subsystem pipeline 11. In general, a built-in self-test may be a set of structured techniques for testing a set of hardware logic blocks. In the example of FIG. 2, testing module 24 may perform a built-in self test of the logic blocks of display subsystem pipeline 11, such as buffer logic 14, fetch logic 16, source surface processor pipes 18, layer mixer 20, and DSPP 22 making up display subsystem pipeline 11, to detect faults in display subsystem pipeline 11, by determining whether buffer logic 14, fetch logic 16, source surface processor pipes 18, layer mixer 20, and DSPP 22, while processing an image, introduces an error into the image. If testing module 24 determines that display subsystem pipeline 11 introduces an error into the image, then testing module 24 may detect a fault within one of the hardware logic blocks of display subsystem pipeline 11.

Examples of testing module 24 may include a multiple input signature register (MISR), a linear feedback shift register (LFSR), and the like. Specifically, testing module 24 may receive an input and may output a checksum that is based on the received input. Such a checksum may be unique to the input received by testing module 24 such that there is a one-to-one relationship between the received input and the associated output. As such, testing module 24 may be hardware that performs a one-to-one hash function or another suitable function between an input and its corresponding output.

Display system 2 may perform concurrent online testing of display processor 10 using testing module 24. In other words, display system 2 may perform the built-in self test of display processor 10 while display system 2 is power-on and performing the functionality of display system 2. For example, display system 2 may perform concurrent online testing of display processor 10 while video sources 4 capture a real-time video and as display system 2 outputs, via display device 12, the real time video captured by video sources 4.

As discussed above, display system 2 may utilize testing module 24 to perform a built-in self-test of display processor 10 by determining whether an error has been introduced to an image while it is processed by one or more hardware units of display processor 10. Specifically, testing module 24 may determine whether the display subsystem pipeline introduces an error while processing an image through the pipeline. During the built-in self-test of display processor 10, display system 2 may generate a test pattern and may associate a checksum with the test pattern. Display system 2 may modify an image by inserting the generated test pattern into a portion of the image, and may send the modified image to display processor 10 for processing. Display processor 10 may process the modified image through buffer logic 14, fetch logic 16, source surface processor pipes 18, layer mixer 20, and DSPP 22. Testing module 24 may generate a checksum from the test pattern of the image after the image has been processed through buffer logic 14, fetch logic 16, source surface processor pipes 18, layer mixer 20, and DSPP 22 and may compare the generated checksum with the specific checksum associated with the test pattern to determine whether buffer logic 14, fetch logic 16, source surface processor pipes 18, layer mixer 20, or DSPP 22 introduces a fault during processing of the image.

Along with the modified image, display system 2 may send to display processor 10 an indication of which portion of the image is modified by the inclusion of the test pattern. Display system 2 may configure each of buffer logic 14, fetch logic 16, source surface processor pipes 18, layer mixer 20, and DSPP 22, based on the indication, to not perform any image processing operations on the portion of the modified image where the test pattern is included. Thus, if the portion of the image that includes the test pattern is modified during the processing of the image by buffer logic 14, fetch logic 16, source surface processor pipes 18, layer mixer 20, and DSPP 22, display system 2 may determine that a fault has occurred in one of buffer logic 14, fetch logic 16, source surface processor pipes 18, layer mixer 20, and DSPP 22.

Testing module 24 may generate a checksum from the test pattern of the image after processing by buffer logic 14, fetch logic 16, source surface processor pipes 18, layer mixer 20, and DSPP 22, and may compare the generated checksum with the specific checksum associated with the test pattern that is inserted into the image. If the portion of the image that includes the test pattern is modified during the processing, testing module 24 may generate a checksum that is different from the specific checksum associated with the test pattern. Thus, if the two checksums differ, testing module 24 may determine that a fault has occurred in one of buffer logic 14, fetch logic 16, source surface processor pipes 18, layer mixer 20, and DSPP 22 during processing of the image.

Because display system 2 performs the built-in self-test concurrently and online, display system 2 does not perform the built-in self test by entering into a dedicated test mode. Instead, such a test is performed while display system 2 is powered on and operating to perform its normal functionality, such as displaying on display device 12 the live video that is captured by video sources 4. If testing module 24 determines that, during the built-in self-test, display subsystem pipeline 11 has modified a test pattern of an image while it processes the image through the display subsystem pipeline, even though each unit of the display subsystem pipeline has been configured to not modify the test pattern during processing, then testing module 24 may determine that one or more hardware units of the display subsystem pipeline is not operating properly, and may thereby detect that a fault in display processor 10. Testing module 24 may determine whether the test pattern of the image has been modified by comparing the checksum associated with the test pattern to a checksum generated by testing module 24 from the region of the image where the test pattern resides after the image has been processed by display subsystem pipeline 11.

In the example of FIG. 2, image 32A may be a frame of a video from video sources 4 or any other image that is to be processed by display processor 10 for display by display device 12. Display system 2 may store image 32A in memory 6, such as in output buffer 8. Display system 2 may capture or generate image 32A during the normal course of operations while display system 2 is powered on and operating normally without entering into a dedicated test mode. For example, while display system 2 is operating to output a live video captured by one of video sources 4 for display by display device 12, display system 2 may periodically perform built-in self-test, such as performing the built-in self-test by modifying every $30^{th}$ frame of the video captured by one of video sources 4, modifying a frame every ten seconds display system 2 is powered on, and the like.

As part of the built-in self-test of display processor 10, a software application running on processor 3 may alter image 32A to include a test pattern in a region of interest of image 32A. The region of interest of image 32A may be any suitable sub-portion of pixels (i.e., fewer than all of the pixels) of image 32A. In some examples, the software application may extend image 32A to include the test pattern, such that image 32A as extended includes additional pixels than before it was extended. The software application on processor 3 may alter image 32A by inserting a test pattern into a region of interest of image 32A to produce modified image 32B stored in memory 6, such that modified image 32B includes the test pattern in the region of interest. For example, if image 32A has a resolution of 640×480, the region of interest may be a 32×32 portion of image 32A starting at coordinate (0, 0) to coordinate (639, 31), and modified image 32B may therefore include a test pattern in a region of interest starting at coordinate (0, 0) to coordinate (639, 31). The test pattern that processor 3 may insert into image 32A to produce modified image 32B may be any suitable image or pattern for which processor 3 may calculate a checksum, which may be a small sized datum, such as a string of letters and numbers, for the set of pixels making up the test pattern over the entire region of interest according to any suitable algorithm, such as a hash function. For example, the test pattern may be any color, size, pattern, and the like.

Processor 3 may associate a checksum with the test pattern inserted in the region of interest of image 32A. Such a checksum may be referred to as an input checksum The checksum may be used as part of the built-in self-test of display processor 10 to detect possible faults in the hardware units making up display processor 10. In one example, processor 3 may generate the test pattern inserted in the region of interest of image 32A based upon a specify checksum via a hash function or any other suitable function. Processor 3 may, based upon the specified checksum, generate a set of pixels that is inserted as the test pattern into the region of interest of image 32A. In another example, processor 3 may derive a checksum from the test pattern in the region of interest based on a hash function or another suitable function. Processor 3 may take the block of pixels making up the test pattern in the region of interest as input into a checksum generation function to generate the checksum.

In another example, the input checksum may be specified by a user or may be otherwise specified. For example, the input checksum may be set at the factory prior to the sale of display system 2. Display system 2 may set a multiple input shift register (MISR) to a particular value based on the input checksum such that the MISR may take the test pattern as input to produce an output that is the input checksum. That is, display system 2 may configure a MISR in a particular way such that inputting the test pattern into the MISR generates the same checksum as the specified input checksum.

Display system 2 may process modified image 32B through the display subsystem pipeline and may detect a fault in one or more hardware units of display processor 10 based at least in part on comparing the region of interest of modified image 32B that includes the test pattern after processing by the display subsystem pipeline 11 with the region of interest of modified image 32B that includes the test pattern prior to processing by the display subsystem pipeline 11. Display processor 10 may retrieve modified image 32B from output buffer 8, and may process modified image 32B through display subsystem pipeline 11 of buffer logic 14, fetch logic 16, source surface processor pipes 18, layer mixer 20, and DSPP 22. Testing module 24 may receive modified image 32B from DSPP 22 after DSPP 22 has processed modified image 32B and calculate a checksum of the region of interest of modified image 32B. The checksum calculated by testing module 24 may be referred to as an output checksum.

In one example, testing module 24 may calculate the output checksum using a MISR that is configured such that the MISR generates the same output checksum as the input checksum associated with the test pattern if the region of interest of modified image 32B that includes the test pattern after processing by the display subsystem pipeline 11 is the same as the region of interest of modified image 32B that includes the test pattern prior to processing by the display subsystem pipeline 11. In other examples, testing module 24 may perform any other suitable techniques for determining whether the region of interest of modified image 32B that includes the test pattern after processing by the display subsystem pipeline 11 is the same as the region of interest of modified image 32B that includes the test pattern prior to processing by the display subsystem pipeline 11.

Testing module 24 may compare the checksum calculated by testing module 24 (i.e., the output checksum) with the checksum associated with the test pattern inserted into the region of interest of image 32A (i.e., the input checksum). If the calculated checksum matches the checksum associated with the test pattern inserted into the region of interest of image 32A, meaning that the calculated checksum is equal to the checksum associated with the test pattern inserted into the region of interest of image 32A, processor 3 may determine that no fault has occurred while display subsystem pipeline 11 processes modified image 32B.

On the other hand, if the calculated checksum does not match the checksum associated with the test pattern inserted into the region of interest of image 32A, meaning that the calculated checksum is not equal to the checksum associated with the test pattern inserted into the region of interest of image 32A, processor 3 may, in response, determine that a fault has occurred while display subsystem pipeline 11 processes modified image 32B. Specifically, processor 3 may determine that the modified portion of modified image 32B differs from the test pattern inserted by processor 3 to the region of interest of image 32A to produce modified image 32B if the calculated checksum is not equal to the checksum associated with the test pattern inserted into the region of interest of image 32A, and may therefore determine that display subsystem pipeline 11 of buffer logic 14, fetch logic 16, source surface processor pipes 18, layer mixer 20, and DSPP 22 has introduced an error to modified image 32B when processing modified image 32B.

If processor 3 determines that display subsystem pipeline 11 of display processor 10 has introduced an error to modified image 32B when processing modified image 32B, processor 3 may determine that display processor 10 is malfunctioning and may report the error and/or malfunction to a safety processor (not shown) of display system 2. Display system 2 may, in response to processor 3 detecting the error and/or malfunction of display processor 10, output an alert that indicates display system 2 is not working properly. For example, display system 2 may output an error message indicative of the error and/or malfunction for display by display device 12. In another example, display system 2 may output an audible alert via a speaker device. Alternatively, display system 2 may power itself down or may power cycle itself.

In another example, testing module 24 may calculate the output checksum and perform the comparison of the calculated checksum with the checksum associated with the test pattern inserted into the region of interest of image 32A. In this example, display processor 10 may store, such as into a register, the checksum associated with the test pattern inserted into the region of interest of image 32A, and testing module 24 may determine whether the calculated checksum is equal to the checksum associated with the test pattern inserted into the region of interest of image 32A stored by display processor 10.

To further narrow down the source of a fault that occurs during the processing of modified image 32B, testing module 24 may calculate the checksum of the region of interest of modified image 32B after each stage of processing of modified image 32B in display subsystem pipeline 11. For example, after source surface processor pipes 18 has processed modified image 32B, testing module 24 may receive the processed modified image 32B from source surface processor pipes 18, calculate the checksum for the region of interest of modified image 32B received from source surface processor pipes 18, and compare the calculated checksum with the checksum associated with the test pattern inserted into the region of interest of image 32A stored by display processor 10. If the calculated checksum is different than the checksum associated with the test pattern inserted into the region of interest of image 32A stored by display processor 10, testing module 24 may determine that there is a fault in source surface processor pipes 18 because source surface processor pipes 18 has introduced an error in the region of interest of modified image 32B.

Similarly after layer mixer 20 has processed modified image 32B, testing module 24 may receive the processed modified image 32B from layer mixer 20, calculate the checksum for the region of interest of modified image 32B received from layer mixer 20, and compare the calculated checksum with the checksum associated with the test pattern inserted into the region of interest of image 32A stored by display processor 10. If the calculated checksum is different than the checksum associated with the test pattern inserted into the region of interest of image 32A stored by display processor 10, testing module 24 may determine that there is a fault in layer mixer 20 because layer mixer 20 has introduced an error in the region of interest of modified image 32B.

Furthermore, after DSPP 22 has processed modified image 32B, testing module 24 may receive the processed modified image 32B from DSPP 22, calculate the checksum for the region of interest of modified image 32B received from DSPP 22, and compare the calculated checksum with the checksum associated with the test pattern inserted into the region of interest of image 32A stored by display processor 10. If the calculated checksum is different than the checksum associated with the test pattern inserted into the region of interest of image 32A stored by display processor 10, testing module 24 may determine that there is a fault in DSPP 22 because DSPP 22 has introduced an error in the region of interest of modified image 32B. In this way, testing module 24 may determine the specific hardware unit of display subsystem pipeline 11 that is faulty.

Display processor 10 does not output modified image 32B that includes the test pattern to display device 12, so that display device 12 does not display modified image 32B. As such, modified image 32B that includes the test pattern is not visible to the user of display system 2 that views display device 12. In an example where image 32A has a resolution of 640×480 and the region of interest may be a 32×32 portion of image 32A starting at coordinate (0, 0) to coordinate (639, 31), such that modified image 32B may therefore include a test pattern in a region of interest starting at coordinate (0, 0) to coordinate (639, 31), modified image 32B may nonetheless carry an additional 32×32 pixels of data of the portion of image 32A coordinate (0, 0) to coordinate (639, 31) prior to its modification to generate modified image 32B. Display system 2 may send an indication to display processor 10 that coordinate (0, 0) to coordinate (639, 31) of modified image 32B is the region of interest of modified image 32B that includes the test pattern, as well as an indication that modified image 32B carries an additional 32×32 pixels of data of the portion of image 32A coordinate (0, 0) to coordinate (639, 31) prior to its modification to generate modified image 32B.

When the units of display subsystem pipeline 11 operates on modified image 32B, display subsystem pipeline 11 may perform image processing operations to modify the portions of modified image 32B outside of coordinate (0, 0) to coordinate (639, 31) that is the region of interest. Display subsystem pipeline 11 may also treat the additional 32×32 pixels of data as a pixel block that display subsystem pipeline 11 may perform image processing operations on to modify that 32×32 pixels of data as if it were at coordinate (0, 0) to coordinate (639, 31) of modified image 32B. In other words, display subsystem pipeline 11 may not modify coordinate (0, 0) to coordinate (639, 31) of image 32B, but may modify the additional 32×32 pixels of data as if it were the actual coordinate (0, 0) to coordinate (639, 31) of image 32B.

After processing by display subsystem pipeline 11, display processor 10 may further modify modified image 32B by replacing the region of interest with the additional pixel block that is carried by modified image 32B. Thus, display processor 10 may replace coordinate (0, 0) to coordinate (639, 31) of image 32B with the additional 32×32 pixels of data carried by modified image 32B. Display processor 10 may then output this image to display device 12. In this way, display device 12 does not display the test pattern in the region of interest of modified image 32B, but instead displays original image 32A after processing by display subsystem pipeline 11.

Therefore, while display system 2 modifies image 32A by inserting the test pattern into a region of interest of image 32A to result in modified image 32B that is processed through display subsystem pipeline 11, display processor 10 may remove the test pattern from modified image 32B after processing through display subsystem pipeline 11 before display processor 10 sends the image to display device 12. In this way, display device 12 does not display the test pattern that is inserted into image 32A.

Figure 3A:
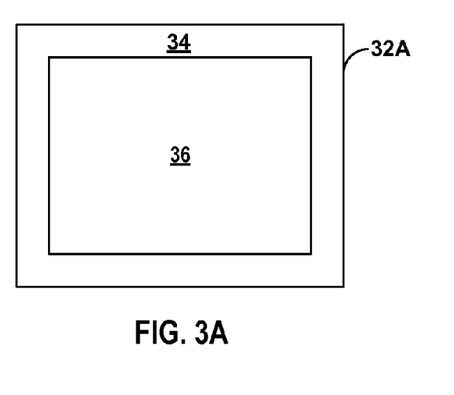
FIGS. 3A-3F are conceptual diagrams illustrating example techniques for the example processor to modify an example image to generate an example modified image in further detail.

FIGS. 3A-3F are conceptual diagrams illustrating example techniques for processor 3 to modify image 32A to generate modified image 32B in further detail. As shown in FIG. 3A, unmodified image 32A may include visual region 36 and non-visual region 34. Visual region 36 of image 32A may be the portion of image 32A that is visibly outputted by display device 12 when image 32A is displayed by display device 12. Conversely, non-visual region 34 of image 32A may be the portion of image 32A that is not visibly outputted by display device 12 when image 32A is displayed by display device 12. Thus, when display device 12 outputs image 32A, display device 12 may output only the visual region 36 of image 32A. For example, image 32A may be a 640×480 image where visual region 36 may be a 616×456 image, and where non-visual region 34 may comprise a 12 pixel border around visual region 36. In this example, display device 12 may only display the 616×456 visual region 36 without displaying non-visual region 34. In some other examples, image 32A may include only visual region 36 and does not include non-visual region 34.

Figure 3B:
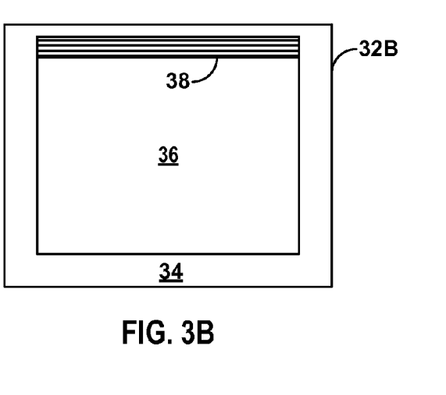

As discussed above, processor 3 may modify a region of interest within image 32A by inserting a specified graphical pattern (e.g., a test pattern) into the region of interest within image 32A, to result in modified image 32B. The graphical pattern may be any image and/or block of pixels made up of one or more suitable colors, patterns of pixels, and the like. As shown in FIG. 3B, processor 3 may select region of interest 38 that extends the start of the frame of visual region 36 to modify to generate modified image 32B that has a test pattern in the same region of interest 38. In the example of FIG. 3B, region of interest 38 may extend visual region 36 and may begin immediately above the first line of visual region 36, extending vertically above one or more lines of visual region 36 from the first line of visual region 36.

Figure 3C:
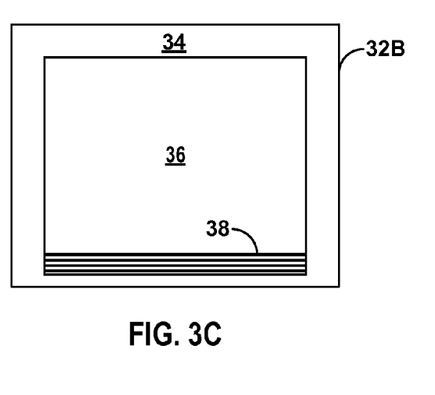

As shown in FIG. 3C, processor 3 may select region of interest 38 that extends the end of the frame of visual region 36 to modify to generate modified image 32B. In the example of FIG. 3B, region of interest 38 may extend visual region 36 and may begin immediately below the last line of visual region 36, extending vertically down one or more lines of visual region 36 from the last line of visual region 36.

Figure 3D:
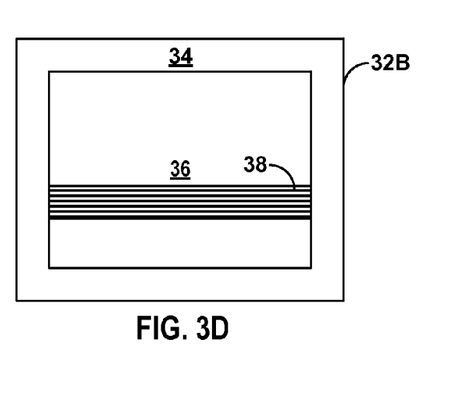

As shown in FIG. 3D, processor 3 may select region of interest 38 that is anywhere within visual region 36 to modify to generate modified image 32B. In the example of FIG. 3D, region of interest 38 may occupy any sub-portion of visual region 36, such as any square, rectangular, circular, triangular block of pixels within visual region 36.

Figure 3E:
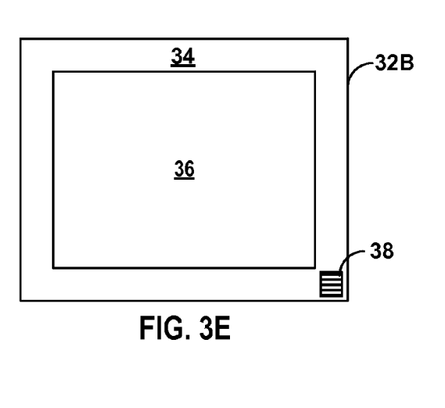

As shown in FIG. 3E, processor 3 may select region of interest 38 that is within non-visual region 34 to modify to generate modified image 32B having region of interest 38 within non-visual region 34 of modified image 32B. In the example of FIG. 3E, region of interest 38 may occupy any sub-portion of non-visual region 34, such as any square, rectangular, circular, triangular block of pixels within non-visual region 34.

Figure 3F:
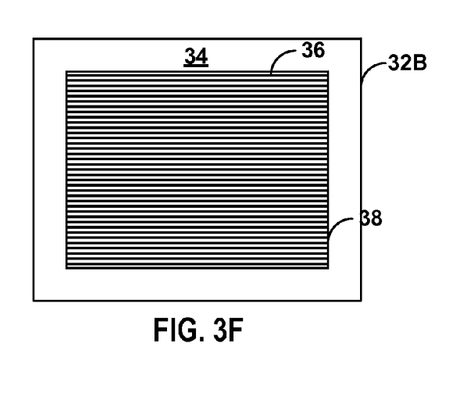

As shown in FIG. 3F, processor 3 may select region of interest 38 that is the entirety of visual region 36 to modify to generate modified image 32B. Such a modification of the entire visual region 36 may be appropriate during the power up phase and/or power down phase of display system 2 when display device 12 is not yet or is no longer displaying critical data, such as the video captured by video sources 4.

In some examples, image 32A and modified image 32B may not include non-visual region 34. In these examples, image 32A and modified image 32B may be entirely visual region 36.

Besides testing display processor 10 using incoming display frame data, display system 2 may further perform a built-in self-test of display processor 10 by generating test patterns during the vertical blanking interval of display processor 10 while display system 2 is online and operating to perform its normal functionality. The vertical blanking interval may be the time between the end of the final line of a frame or field and the beginning of the first line of the next frame. Such testing of processor 10 may be a hardware-based non-destructive self-test for display processor 10 and may not require user modification of any software applications that are executed by processor 3.

Figure 4:
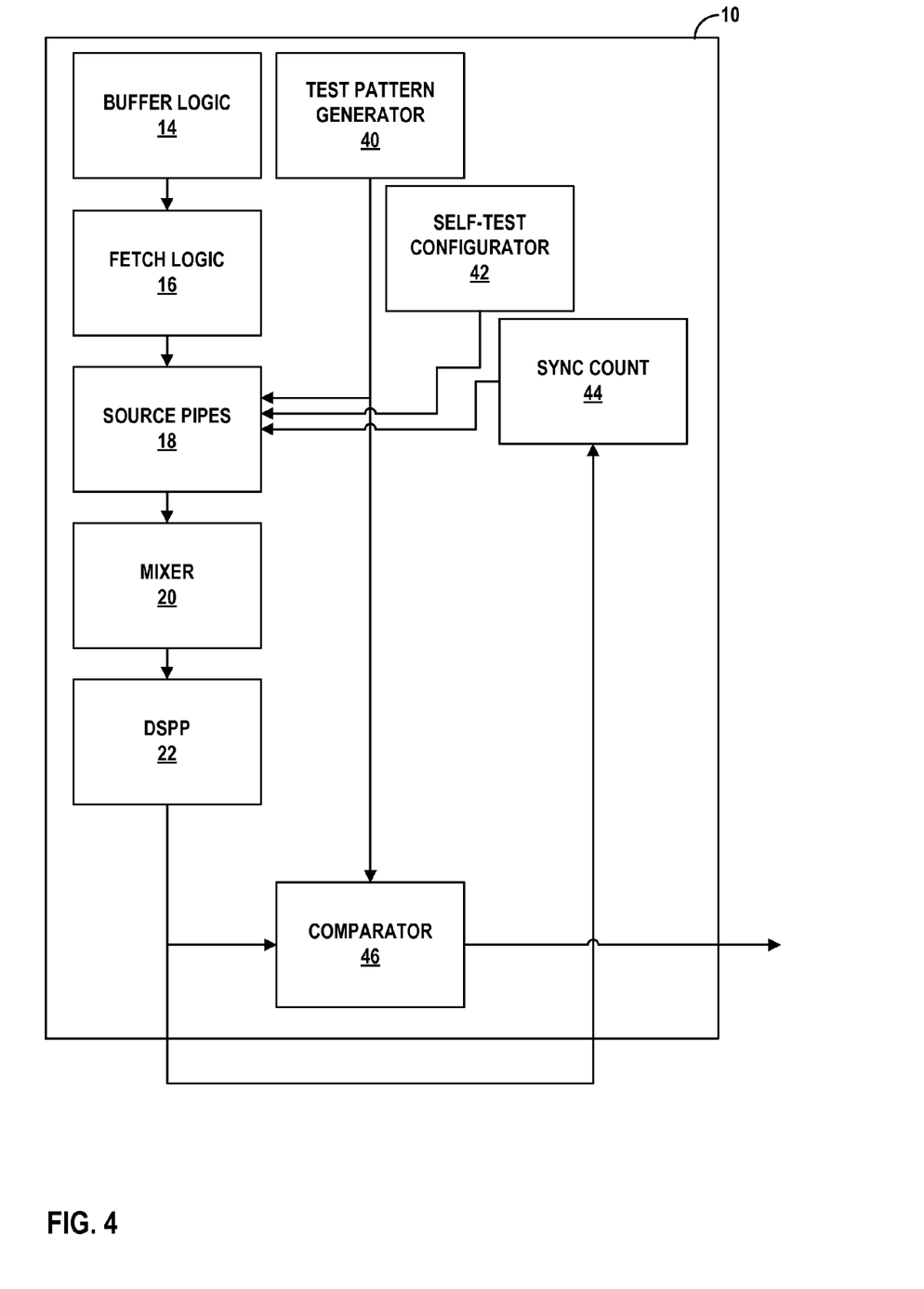
FIG. 4 is a block diagram illustrating another example of the display processor that is configured to perform self-testing during vertical blanking intervals.

FIG. 4 is a block diagram illustrating another example of display processor 10 configured to perform self-testing during vertical blanking intervals. As shown in FIG. 4, display processor 10, in addition to buffer logic 14, fetch logic 16, source surface processor pipes 18, mixer 20, and DSPP 22, may also include test pattern generator 40, self-test configurator 42, sync count unit 44, and comparator 46, which are hardware for performing non-destructive self-testing of display processor 10.

Test pattern generator 40 may generate an image that includes a test pattern that is used to test display processor 10. The test pattern may be any suitable block of pixels in any suitable pattern, color, and the like. Self-test configurator 42 may be usable to configure the self-testing of display processor 10 using the test pattern generated by test pattern generator 40. Self-test configurator 42 may configure the testing intervals for testing display processor 10 using the test pattern image generated by test pattern generator 40. For example, self-test configurator 42 may configure display processor 10 to be tested at every vertical blanking interval within a set of vertical blanking intervals.

Self-test configurator 42 may also configure display processor 10 to be tested at every n-th vertical blanking interval, where n is a positive integer greater than 1, such as every $5^{th}$ vertical blanking interval. In this example, after every four successive vertical blanking intervals, display processor 10 may be tested by processing the test pattern image generated by test pattern generator 40 at the $5^{th}$ vertical blanking interval through its hardware blocks, as described below.

Sync count unit 44 may receive an indication of a vertical blanking interval from display processor 10, and may determine whether to send a request to source surface processor pipes 18 to request the test pattern from test pattern generator 40 based on the testing interval configured by self-test configurator 42.

Upon receiving a request from sync count unit 44 to process the test pattern image generated by test pattern generator 40, source surface processor pipes 18 may request the test pattern image from test pattern generator 40, and source surface processor pipes 18, mixer 20, and DSPP 22 may process the test pattern image through source surface processor pipes 18, mixer 20, and DSPP 22. Similar to the processing of modified image 32B discussed with respect to FIG. 2, source surface processor pipes 18, mixer 20, and DSPP 22 may be configured to not intentionally modify the test pattern image during processing of the test pattern image. Instead, source surface processor pipes 18 may be configured to receive the test pattern image and to output the test pattern image without modification to mixer 20. Similarly, mixer 20 may be configured to receive the test pattern image and to output the test pattern image without modification to DSPP 22. DSPP 22 may be configured to receive the test pattern image and to output the test pattern image without modification to comparator 46.

Comparator 46 may receive and compare the test pattern generated by test pattern generator 40 with the test pattern generated by test pattern generator 40 after processing by source surface processor pipes 18, mixer 20, and DSPP 22.

If comparator determines that the test pattern generated by test pattern generator 40 is the same as the test pattern generated by test pattern generator 40 after processing by source surface processor pipes 18, mixer 20, and DSPP 22, comparator 46 may determine that source surface processor pipes 18, mixer 20, and DSPP 22 are operating correctly because they have not introduced an error to the test pattern generated by test pattern generator 40. On the other hand, if comparator determines that the test pattern generated by test pattern generator 40 is not the same as the test pattern generated by test pattern generator 40 after processing by source surface processor pipes 18, mixer 20, and DSPP 22, comparator 46 may determine that source surface processor pipes 18, mixer 20, and DSPP 22 are not operating correctly because they have introduced an error to the test pattern generated by test pattern generator 40.

Comparator 46 may compare the test pattern generated by test pattern generator 40 with the test pattern generated by test pattern generator 40 after processing by source surface processor pipes 18, mixer 20, and DSPP 22 by comparing a checksum associated with the test pattern generated by test pattern generator 40 with a checksum associated with the test pattern generated by test pattern generator 40 after processing by source surface processor pipes 18, mixer 20, and DSPP 22. For example, test pattern generator 40 may generate a pre-processing checksum based on the test pattern generated by test pattern generator 40. Comparator 46 may generate a post-processing checksum based on the test pattern after processing by source surface processor pipes 18, mixer 20, and DSPP 22. Test pattern generator 40 and comparator 46 may generate the pre-processing checksum and the post-processing checksum via the same algorithm.

Comparator 46 may compare the pre-processing checksum with the post-processing checksum to determine whether the test pattern generated by test pattern generator 40 is the same as the test pattern generated by test pattern generator 40 after processing by source surface processor pipes 18, mixer 20, and DSPP 22. If comparator 46 determines that the pre-processing checksum is the same as the post-processing checksum, it may indicate that no errors have occurred in processing the test pattern by source surface processor pipes 18, mixer 20, and DSPP 22. On the other hand, if comparator 46 determines that the pre-processing checksum is not the same as the post-processing checksum, it may indicate that an error has occurred in processing the test pattern by source surface processor pipes 18, mixer 20, and DSPP 22.

If comparator 46 determines that source surface processor pipes 18, mixer 20, and DSPP 22 are not operating correctly, comparator 46 may send an interrupt or any other suitable indication of an error in display processor 10 to, for example, processor 3 may output an error message for display by display device 12 that warns the user of display system 2 of a possible malfunction of display system 2.

Figure 5A:
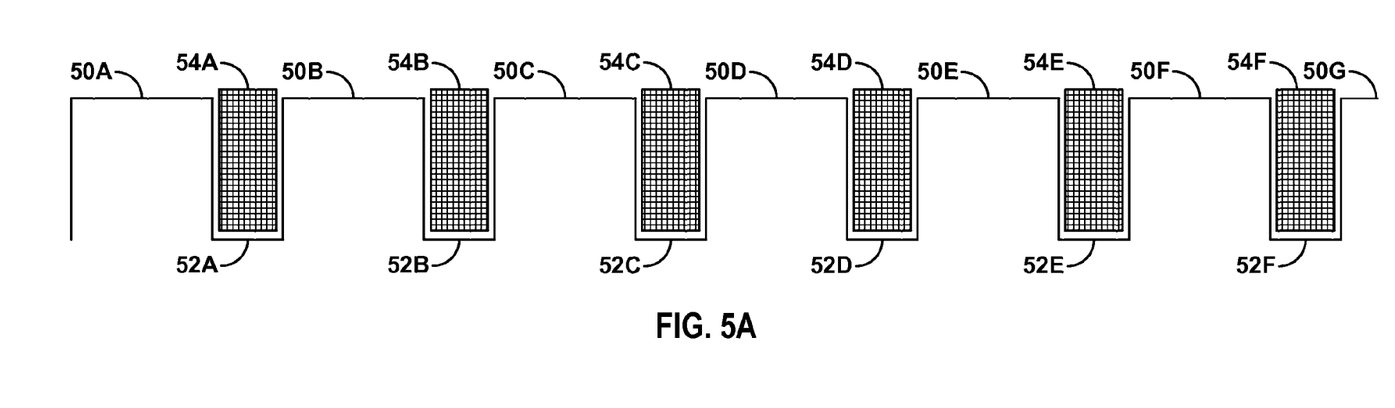
FIGS. 5A and 5B are conceptual diagrams illustrating example testing intervals of the built-in self-test of FIG. 4 in further detail.

FIGS. 5A and 5B are conceptual diagrams illustrating example testing intervals of the built-in self-test of FIG. 4 in further detail. As shown in FIG. 5A, a vertical blanking interval for display processor 10 may occur between processing of two video frame that display processor 10 outputs to display device 12 for display by display device 12. Vertical blanking interval 52A may occur between processing of video frames 50A and 50B, vertical blanking interval 52B may occur between processing of video frames 50B and 50C, vertical blanking interval 52C may occur between processing of video frames 50C and 50D, vertical blanking interval 52D may occur between processing of video frames 50D and 50E, vertical blanking interval 52E may occur between processing of video frames 50E and 50F, and vertical blanking interval 52F may occur between processing of video frames 50F and 50G. In the example of FIG. 5A, display processor 10 may perform a built-in self-test during each vertical blanking interval of vertical blanking intervals 52A-52F using test pattern images 54A-54F generated by test pattern generator 40.

Figure 5B:
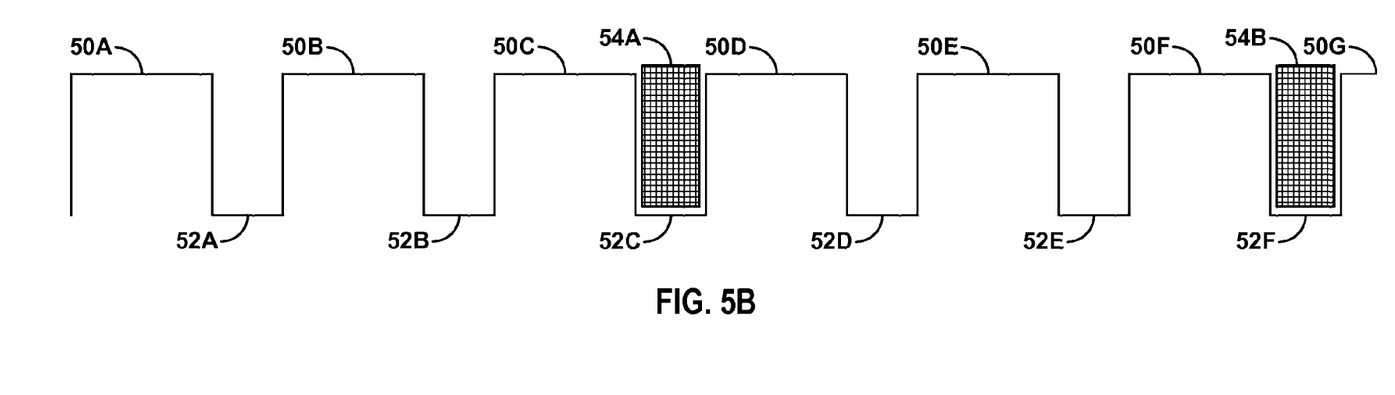

Display processor 10 may also be configured to perform a built-in self-test during every n-th vertical blanking interval of vertical blanking intervals 52A-52F. In the example of FIG. 5B, n may be set to 3, such that display processor 10 may be configured to perform a built-in self-test during every $3^{rd}$ vertical blanking interval. As shown in FIG. 5B, after vertical blanking intervals 52A and 52B, display processor 10 may perform a built-in self-test during vertical blanking interval 52C using test pattern image 54A. After performing the built-in self-test at vertical blanking interval 52C, display processor 10 may wait another 2 vertical blanking intervals 52D and 52E to perform another built-in self-test at the $3^{rd}$ vertical blanking interval 52F following blanking interval 52C using test pattern image 54B.

Figure 6:
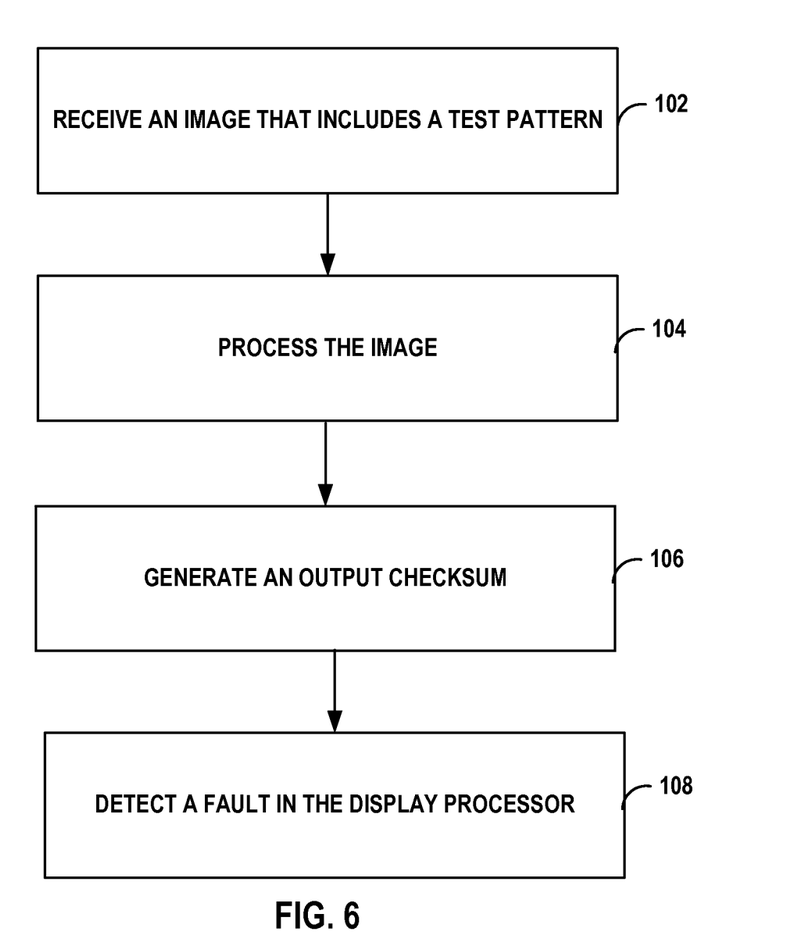
FIG. 6 is a flow chart illustrating an example operation of an ADAS in further detail.

FIG. 6 is a flow chart illustrating an example operation of display system 2 in further detail. As shown in FIG. 6, Display processor 10 may receive modified image 32B, which may be image 32A as modified by processor 3 to include the test pattern (102). An input checksum is associated with the test pattern. One or more hardware units of display processor 10, such as buffer logic 14, fetch logic 16, source surface processor pipes 18, mixer 20, and DSPP 22 may process modified image 32B, which may be image 32A as modified by processor 3 according to the techniques of the present disclosure (104). Display processor 10 may generate an output checksum based at least in part on the test pattern of modified image 32B after processing by the one or more hardware units of display processor 10 (106). Display processor 10 may detect a fault in display processor 10 based at least in part on determining a difference between the input checksum and the output checksum (108).

In some examples, one of video sources 4 may capture a video, and image 32A may be a frame of the video. Processor 3 may modify the frame of the video to include the test pattern to generate modified image 32B. In some examples, image 32A may include a visual region and a non-visual region, and the region of interest may be a sub-portion of the non-visual region of image 32A. In this example, modifying the frame of the video to include the test pattern to generate modified image 32B may include modifying the non-visual region of the image to include the test pattern.

In some examples, image 32A may include a visual region and a non-visual region, and the test pattern may be a sub-portion of the visual region of image 32A. In this example, modifying the frame of the video to include the test pattern to generate modified image 32B may include modifying the visual region of the image to include the test pattern. In some examples, the test pattern may extend a start of frame sub-portion of the visual region of image 32A. In some examples, the test pattern may extend an end of frame sub-portion of the visual region of image 32A.

In some examples, display processor 10 may detect the fault in the one or more hardware units of display processor 10 in response to determining that the input checksum is different than the output checksum. In some examples, display processor 10 processing the image may include the display subsystem pipeline 11 processing the image. In some examples, a vehicle includes display system 2.

In some examples, test pattern generator 40 of display processor 10 may generate a test pattern image, wherein the test pattern image is associated with an input test checksum. During a vertical blanking interval for display processor 10, one or more hardware units of display processor 10, such as source surface processor pipes 18, mixer 20, and DSPP 22, may process the test pattern image generated by test pattern generator 40. Display processor 10 may generate an output test checksum based at least in part on the test pattern image after processing by the one or more hardware units of display processor 10. Display processor 10 may detect a fault in the one or more hardware units of display processor 10 based at least in part on determining a difference between the input test checksum and the output test checksum.

In some examples, display processor 10 may perform the processing and the detecting for every n-th vertical blanking interval of a plurality of vertical blanking intervals for display processor 10, wherein n is greater than one. In some examples, display processor 10 may perform the processing and the detecting for every vertical blanking interval of a plurality of vertical blanking intervals for display processor 10.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for testing of a display system, the method comprising:
 performing, by a computing device, a built-in self test of a display processor of the computing device without entering a dedicated test mode, including:
  receiving, by the computing device from a video source, an image that is to be processed by the display processor, wherein the image includes a visual region and a non-visual region,
  modifying, by the computing device, the image that is to be processed by the display processor to include a test pattern associated with an input checksum in the non-visual region of the image,
  processing, by one or more pre-determined hardware units of the display processor, the image, including performing, by the one or more pre-determined hardware units of the display processor, one or more image processing operations on the image that alter at least a portion of the visual region of the image,
  generating, by the display processor, an output checksum based at least in part on the test pattern after processing of the image by the one or more pre-determined hardware units of the display processor, and
  prior to outputting the image to a display device, detecting, by the computing device, whether a fault has occurred in the one or more pre-determined hardware units of the display processor based at least in part on determining whether there is a difference between the input checksum and the output checksum; and
  in response to determining that the fault has not occurred in the one or more pre-determined hardware units of the display processor, outputting, by the display processor, the image to the display device, so that the display device displays the visual region of the image without displaying the non-visual region of the image that includes the test pattern.

2. The method of claim 1, further comprising:
 capturing, by the video source, a video; and
 modifying, by the computing device, a frame of the video to include the test pattern.

3. The method of claim 1, wherein processing, by the one or more pre-determined hardware units of the display processor, the image, comprises processing, by a display subsystem pipeline of the display processor, the image.

4. The method of claim 1, further comprising:
 generating, by the computing device, a test pattern image, wherein an input test checksum is associated with the test pattern image;
 during a vertical blanking interval for the display processor of the computing device, processing, by the one or more pre-determined hardware units of the display processor, the test pattern image;
 generating, by the display processor, an output test checksum based at least in part on the test pattern image after processing of the test pattern image by the one or more pre-determined hardware units of the display processor; and
 detecting, by the computing device, a fault in the one or more pre-determined hardware units of the display processor based at least in part on determining a difference between the input test checksum and the output test checksum.

5. The method of claim 4, further comprising:
 performing, by the display processor, the processing and the detecting for every n-th vertical blanking interval of a plurality of vertical blanking intervals for the display processor, wherein n is greater than one.

6. The method of claim 4, further comprising:
performing, by the display processor, the processing and the detecting for every vertical blanking interval of a plurality of vertical blanking intervals for the display processor.

7. An apparatus comprising:
a memory configured to store an image received from an image source, wherein the image includes a visual region and a non-visual region;
a display processor configured to perform a built-in self test of the display processor without entering a dedicated test mode, including:
  modify the image that is to be processed by the display processor to include a test pattern associated with an input checksum in the non-visual region of the image;
  process, by one or more pre-determined hardware units of the display processor, the image, including performing, by the one or more pre-determined hardware units of the display processor, one or more image processing operations on the image that alter at least a portion of the visual region of the image;
  generate an output checksum based at least in part on the test pattern after processing of the image by the one or more pre-determined hardware units of the display processor;
  prior to outputting the image to a display device, detect whether a fault has occurred in the one or more pre-determined hardware units of the display processor based at least in part on determining whether there is a difference between the input checksum and the output checksum; and
  in response to determining that the fault has not occurred in the one or more pre-determined hardware units of the display processor, output the image to the display device, so that the display device displays the visual region of the image without displaying the non-visual region of the image that includes the test pattern.

8. The apparatus of claim 7, wherein:
the video source is configured to output a video to the memory; and
the display processor is further configured to:
  modify a frame of the video to include the test pattern.

9. The apparatus of claim 8, wherein:
the apparatus is a vehicle that includes an advanced driver assistance system (ADAS); and
the ADAS includes the memory and the display processor.

10. The apparatus of claim 7, wherein the display processor is further configured to:
process, by a display subsystem pipeline of the display processor, the image.

11. The apparatus of claim 7, wherein the display processor is further configured to:
generate a test pattern image, wherein the test pattern image is associated with an input test checksum;
during a vertical blanking interval for the display processor, process the test pattern image;
generate an output test checksum based at least in part on the test pattern image after processing of the test pattern image; and
detect a fault in the one or more pre-determined hardware units of the display processor based at least in part on determining a difference between the input test checksum and the output test checksum.

12. The apparatus of claim 11, wherein the display processor is further configured to:
perform the processing and the detecting for every n-th vertical blanking interval of a plurality of vertical blanking intervals for the display processor, wherein n is greater than one.

13. The apparatus of claim 11, wherein the display processor is further configured to:
perform the processing and the detecting for every vertical blanking interval of a plurality of vertical blanking intervals for the display processor.

14. The apparatus of claim 13, wherein:
the apparatus is an advanced driver assistance system (ADAS).

15. An apparatus comprising:
means performing a built-in self test without entering a dedicated test mode, including:
  means for receiving, from a means for capturing video, an image that is to be processed, wherein the image includes a visual region and a non-visual region,
  means for modifying the image to include a test pattern associated with an input checksum in the non-visual region of the image,
  means for processing the image, including means for performing one or more image processing operations on the image that alter at least a portion of the visual region of the image,
  means for generating an output checksum based at least in part on the test pattern after processing of the image by the means for processing the image, and
  means for detecting whether a fault has occurred in the means for processing the image based at least in part on determining whether there is a difference between the input checksum and the output checksum prior to outputting the image to a display device; and
means for, in response to determining that the fault has not occurred in the means for processing the image, outputting the image to means for displaying the image, so that the means for displaying the image displays the visual region of the image without displaying the non-visual region of the image that includes the test pattern.

16. The apparatus of claim 15, further comprising:
means for modifying a frame of the video to include the test pattern.

17. The apparatus of claim 15, further comprising:
means for generating a test pattern image, wherein the test pattern image is associated with an input test checksum;
means for processing, during a vertical blanking interval for the means for processing the image, the test pattern image;
means for generating an output test checksum based at least in part on the test pattern image after processing of the test pattern image by the means for processing; and
means for detecting a fault in the means for processing the test pattern image based at least in part on determining a difference between the input test checksum and the output test checksum.

18. A non-transitory computer-readable storage medium comprising instructions for causing at least one programmable processor to:
perform a built-in self test of a display processor without entering a dedicated test mode, including:
  receive, from a video source, an image that is to be processed by the display processor, wherein the image includes a visual region and a non-visual region, modify, by the computing device, the image that is to be processed by the display processor to include a test pattern associated with an input checksum in the non-visual region of the image, process the image, including performing, by one or more pre-determined hardware units of the display processor, one or more image processing operations on the image that alter at least a portion of the visual region of the, generate an output checksum based at least in part on the test pattern after the processing of the image, and prior to outputting the image to a display device, detect whether a fault has occurred in the one or more pre-determined hardware units of the display processor based at least in part on determining whether there is a difference between the input checksum and the output checksum; and in response to determining that the fault has not occurred in the one or more pre-determined hardware units of the display processor, output the image to the display device, so that the display device displays the visual region of the image without displaying the non-visual region of the image that includes the test pattern.

19. The non-transitory computer-readable storage medium of claim 18, wherein the instructions further cause the at least one programmable processor to:
capture a video; and
modify a frame of the video to include the test pattern.

20. The non-transitory computer-readable storage medium of claim 18, wherein the instructions further cause the at least one programmable processor to:
generate a test pattern image, wherein the test pattern image is associated with an input test checksum;
during a vertical blanking interval for the display processor of the computing device, process the test pattern image;
generate an output checksum based at least in part on the test pattern image after processing of the test pattern image; and
detect a fault in the one or more pre-determined hardware units of the display processor based at least in part on determining a difference between the input test checksum and the output test checksum.

21. The non-transitory computer-readable storage medium of claim 20, wherein the instructions further cause the at least one programmable processor to:
perform the processing and the detecting for every n-th vertical blanking interval of a plurality of vertical blanking intervals for the display processor, wherein n is greater than one.

* * * * *